United States Patent
Lee et al.

(10) Patent No.: US 12,238,659 B2
(45) Date of Patent: Feb. 25, 2025

(54) METHOD AND APPARATUS FOR TRANSMITTING AND RECEIVING MULTI SYNCHRONIZATION SIGNAL BLOCK IN COMMUNICATION SYSTEM

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 487 days.

(21) Appl. No.: 17/856,139

(22) Filed: Jul. 1, 2022

(65) Prior Publication Data

US 2023/0021160 A1    Jan. 19, 2023

(30) Foreign Application Priority Data

Jul. 6, 2021    (KR) .................. 10-2021-0088713
Jul. 1, 2022    (KR) .................. 10-2022-0080993

(51) Int. Cl.
*H04W 56/00*    (2009.01)
*H04W 72/12*    (2023.01)
*H04W 72/1263*    (2023.01)

(52) U.S. Cl.
CPC ..... *H04W 56/001* (2013.01); *H04W 72/1263* (2013.01)

(58) Field of Classification Search
CPC .................. H04W 56/001; H04W 72/1263
See application file for complete search history.

(56) References Cited

U.S. PATENT DOCUMENTS 10,595,291 B2    3/2020    Lee et al.
10,687,366 B2    6/2020    Hui et al.
(Continued)

FOREIGN PATENT DOCUMENTS

EP          4255089 A2  * 10/2023  ........ H04W 72/0446
WO       2018/230984 A1    12/2018
WO    WO-2023284962 A1  *  1/2023  ......... H04B 7/18519

OTHER PUBLICATIONS

NTT Docomo, R1-1809135, 'Maintenance for NR random access', 3GPP TSG RAN WG1 Meeting #94, Aug. 20-24, 2018, pp. 1-16. (Year: 2018).*

*Primary Examiner* — Melvin C Marcelo
(74) *Attorney, Agent, or Firm* — LRK PATENT LAW FIRM

(57) ABSTRACT

A method of a terminal may include: receiving, from a base station, a first SSB having an SSB candidate #n at a first frequency position during a first time period; receiving, from the base station, first mapping relationship information between SSB candidate indexes and SSB indexes; identifying an SSB #k mapped to the SSB candidate #n based on the first mapping relationship information for the first frequency position; acquiring time synchronization with respect to the base station based on the SSB candidate #n; and obtaining beam information for the first frequency position based on the SSB #k, wherein each of n and k is an integer equal to or greater than 0.

20 Claims, 16 Drawing Sheets

(56) References Cited

U.S. PATENT DOCUMENTS

| | | |
|---|---|---|
| 2018/0376438 A1 | 12/2018 | Islam et al. |
| 2019/0364523 A1 | 11/2019 | Wei et al. |
| 2021/0044397 A1 | 2/2021 | Khoshnevisan et al. |
| 2021/0258065 A1 | 8/2021 | Wang et al. |
| 2021/0274503 A1 | 9/2021 | Farag et al. |
| 2022/0272647 A1* | 8/2022 | Sakhnini ............... H04W 16/28 |
| 2023/0103606 A1* | 4/2023 | Lee .......................... H04W 8/24 |
| | | 370/329 |
| 2024/0056281 A1* | 2/2024 | Islam .................... H04L 5/0053 |
| 2024/0284304 A1* | 8/2024 | Lyu .......................... H04L 1/08 |
| 2024/0284365 A1* | 8/2024 | Zhao .................... H04L 5/0094 |

* cited by examiner

400

RMSI CORESET mapping pattern #1

RMSI CORESET mapping pattern #2

RMSI CORESET mapping pattern #3

METHOD AND APPARATUS FOR TRANSMITTING AND RECEIVING MULTI SYNCHRONIZATION SIGNAL BLOCK IN COMMUNICATION SYSTEM

CROSS-REFERENCE TO RELATED APPLICATIONS

This application claims priority to Korean Patent Applications No. 10-2021-0088713 filed on Jul. 6, 2021, and No. 10-2022-0080993 filed on Jul. 1, 2022 with the Korean Intellectual Property Office (KIPO), the entire contents of which are hereby incorporated by reference.

BACKGROUND

1. Technical Field

The present disclosure relates to communication techniques, and more particularly, to techniques for transmitting and receiving multiple synchronization signal blocks (multi-SSB) in a wide band.

2. Description of Related Art

The communication system (e.g., a new radio (NR) communication system or a sixth generation (6G) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

Meanwhile, a base station may transmit synchronization signal blocks (SSBs) multiplexed in the frequency domain, and the SSBs multiplexed in the frequency domain may be transmitted through different beams. When the SSBs multiplexed in the frequency domain have the same SSB index, ambiguity of beam information may occur in the terminal. On the other hand, when the SSBs multiplexed in the frequency domain have different SSB indexes, ambiguity of time synchronization may occur in the terminal.

SUMMARY

Accordingly, exemplary embodiments of the present disclosure are directed to providing methods and apparatuses for transmitting and receiving multi-SSB in a wide band.

According to a first exemplary embodiment of the present disclosure, a method of a terminal may comprise: receiving, from a base station, a first synchronization signal block (SSB) having an SSB candidate #n at a first frequency position during a first time period; receiving, from the base station, first mapping relationship information between SSB candidate indexes and SSB indexes; identifying an SSB #k mapped to the SSB candidate #n based on the first mapping relationship information for the first frequency position; acquiring time synchronization with respect to the base station based on the SSB candidate #n; and obtaining beam information for the first frequency position based on the SSB #k, wherein each of n and k is an integer equal to or greater than 0.

The method may further comprise: receiving, from the base station, a second SSB having an SSB candidate #n+1 at the first frequency position during a second time period; identifying an SSB #k+1 mapped to the SSB candidate #n+1 based on the first mapping relationship information for the first frequency position; acquiring time synchronization with respect to the base station based on the SSB candidate #n+1; and obtaining beam information for the first frequency position based on the SSB #k+1.

The first mapping relationship information may indicate a mapping relationship between an SSB candidate index and an SSB index of an SSB located first in time domain.

The method may further comprise: receiving, from the base station, a third SSB having the SSB candidate #n at a second frequency position during the first time period; receiving, from the base station, second mapping relationship information between SSB candidate indexes and SSB indexes; identifying an SSB #j mapped to the SSB candidate #n based on the second mapping relationship information for the second frequency position; acquiring time synchronization with respect to the base station based on the SSB candidate #n; and obtaining beam information for the second frequency position based on the SSB #j, wherein j is an integer equal to or greater than 0.

The first SSB and the third SSB may be multiplexed in frequency domain, and a first beam pattern used for transmission of SSBs at the first frequency position may be different from a second beam pattern used for transmission of SSBs at the second frequency position.

The SSB candidate #n may be identified based on a physical broadcast channel (PBCH) demodulation reference signal (DMRS) and/or a PBCH payload included in the first SSB.

The first mapping relationship information may be obtained through at least one of a PBCH, remaining minimum system information (RMSI), system information, radio resource control (RRC) message, or combinations thereof received from the base station.

The beam information may mean quasi-colocation (QCL) information.

According to a second exemplary embodiment of the present disclosure, a method of a terminal may comprise: receiving, from a base station, a first synchronization signal block (SSB) having an SSB candidate #n at a first frequency position during a first time period; identifying that an SSB index mapped to the SSB candidate #n at the first frequency position is an SSB #n; receiving, from the base station, a second SSB having the SSB candidate #n at a second frequency position during the first time period; receiving, from the base station, first information indicating an SSB index offset and second information indicating a total number of beams used for transmission of SSBs; and identifying an SSB #k mapped to the SSB candidate #n of the second SSB at the second frequency position based on the SSB #n, the first information, and the second information, wherein each of n and k is an integer equal to or greater than 0.

The SSB #k may be a result of '(the SSB #n+the first information) mod the second information'.

The first SSB received at the first frequency position may be a cell-defining SSB, and an SSB candidate index and an SSB index of the cell-defining SSB may be set to a same value.

The first information and the second information may be obtained through at least one of a physical broadcast channel (PBCH), remaining minimum system information (RMSI), system information, radio resource control (RRC) message, or combinations thereof received from the base station.

The method may further comprise receiving, from the base station, at least one of third information indicating a number of beams multiplexed in frequency domain or fourth information indicating an application scheme of the first information, wherein the fourth information may indicate whether the first information is applied in descending order or in ascending order according to frequency positions.

The first SSB and the second SSB may be multiplexed in frequency domain, a first beam pattern used for transmission of SSBs at the first frequency position may be different from a second beam pattern used for transmission of SSBs at the second frequency position, time synchronization with respect to the base station may be acquired based on the SSB candidate #n, beam information for the first frequency position may be obtained based on the SSB #n, and beam information for the second frequency position may be obtained based on the SSB #k.

According to a third exemplary embodiment of the present disclosure, a method of a base station may comprise: transmitting, to a terminal, a reference cell-defining synchronization signal block (SSB) at a first frequency position during a first time period; transmitting, to the terminal, a non-reference cell-defining SSB at a second frequency position during the first time period; transmitting, to the terminal, remaining minimum system information (RMSI) based on the first frequency position; and transmitting, to the terminal, information on the reference cell-defining SSB, wherein the RMSI is not transmitted based on one or more frequency positions at which the reference cell-defining SSB is not transmitted.

The information on the reference cell-defining SSB may be at least one of information indicating whether an SSB detected by the terminal corresponds to the reference cell-defining SSB, information indicating that an SSB detected at the first frequency position is the reference cell-defining SSB, information on a mapping relationship between the reference cell-defining SSB and the non-reference cell-defining SSB, or combinations thereof.

The information on the reference cell-defining SSB may be included in at least one of a physical broadcast channel (PBCH), the RMSI, system information, radio resource control (RRC) message, or combinations thereof transmitted from the base station.

The reference cell-defining SSB and the non-reference cell-defining SSB may have a same SSB candidate index and different SSB indexes, an SSB candidate index may be used by the terminal to acquire time synchronization with respect to the base station, and an SSB index may be used by the terminal to obtain beam information for each frequency position.

The method may further comprise transmitting, to the terminal, mapping relationship information between the SSB candidate index and the SSB index, wherein the SSB candidate index may be identified based on a PBCH demodulation reference signal (DMRS) and/or a PBCH payload included in each of the reference cell-defining SSB and the non-reference cell-defining SSB, and based on the mapping relationship information for each frequency position, the SSB index mapped to the SSB candidate index may be identified.

The reference cell-defining SSB and the non-reference cell-defining SSB may be multiplexed in frequency domain, and a first beam pattern used for transmission of reference cell-defining SSBs at the first frequency position may be different from a second beam pattern used for transmission of non-reference cell-defining SSBs at the second frequency position.

According to the exemplary embodiments of the present disclosure, the base station may transmit SSBs multiplexed in the frequency domain through different beams. The SSBs multiplexed in the frequency domain may have the same SSB candidate index and different SSB indexes during the same time period. A mapping relationship between SSB candidate index and SSB index may be configured for each frequency position. The SSB candidate index may be identified based on a PBCH DMRS and/or a PBCH payload included in the SSB. The SSB index may be identified based on the SSB candidate index and information on the mapping relationship. The terminal may acquire time synchronization based on the SSB candidate index and may obtain beam information based on the SSB index. Accordingly, ambiguity of time synchronization and/or beam information in the terminal can be resolved, and the performance of the communication system can be improved.

DETAILED DESCRIPTION OF THE EMBODIMENTS

Figure 1:
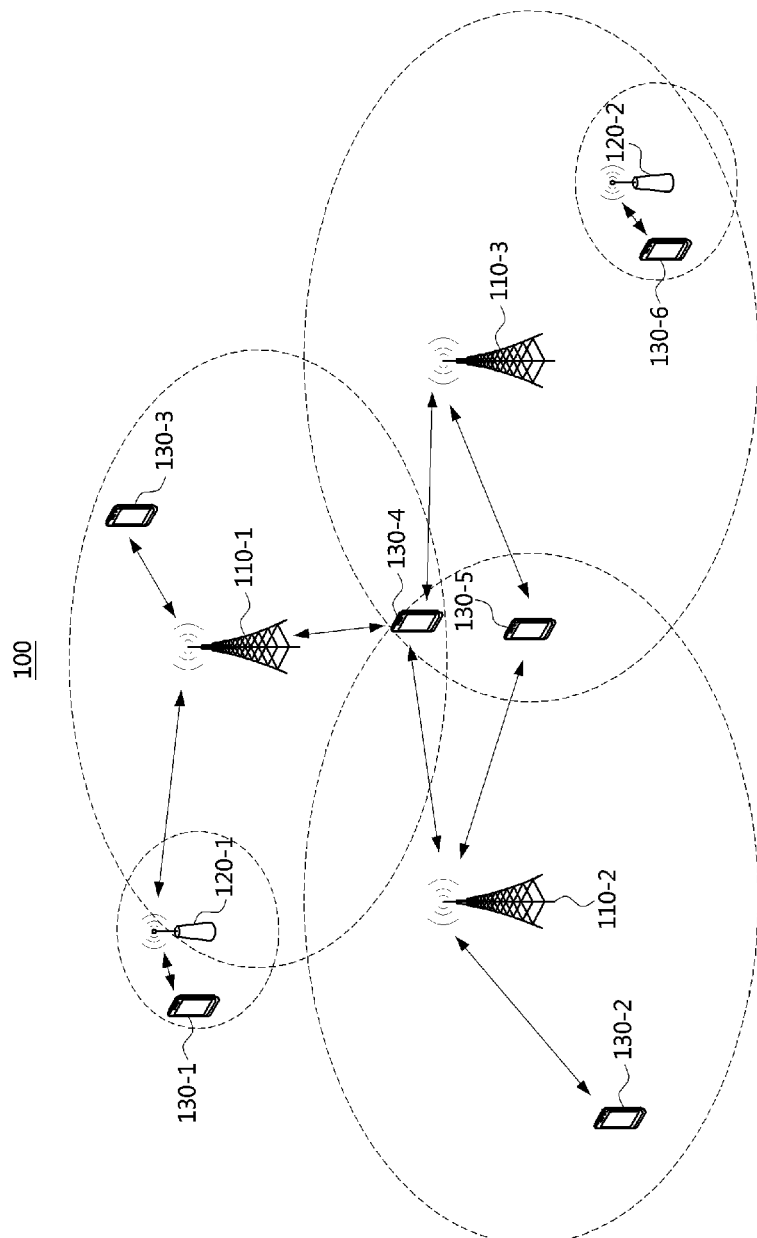
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wide band CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
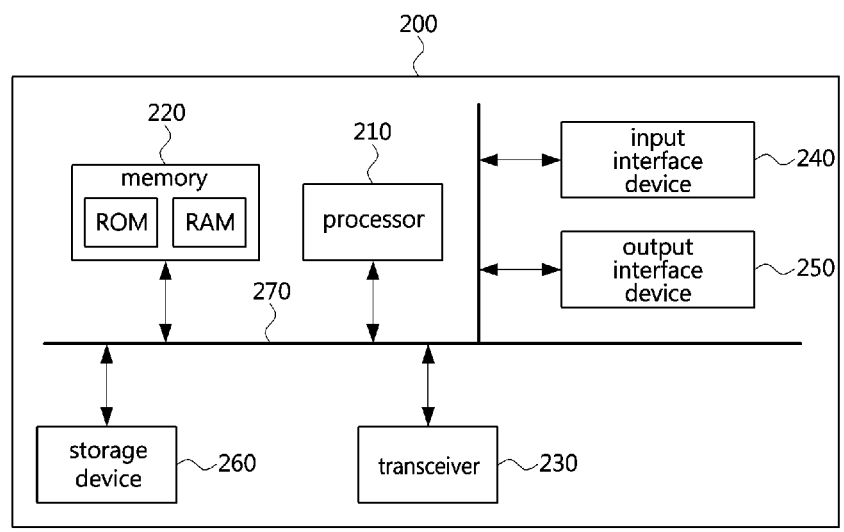
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
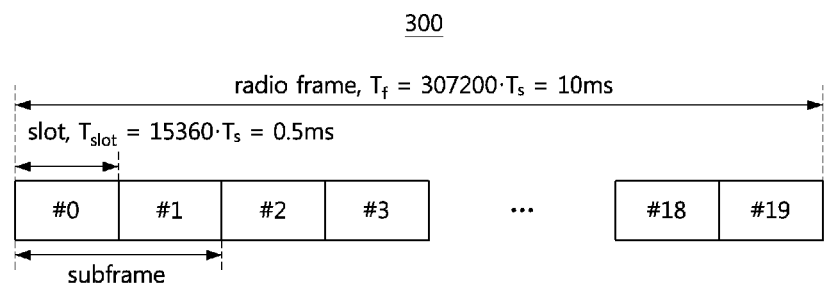
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be $1/30,720,000$s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
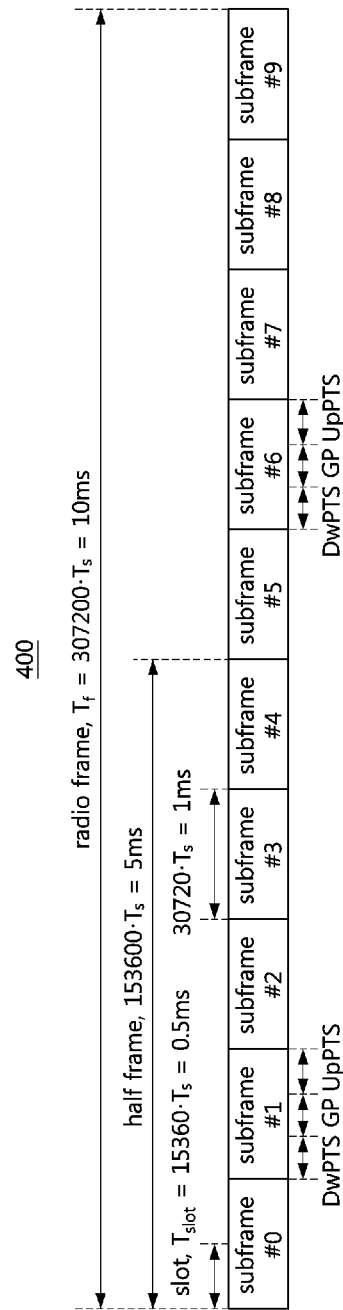
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be $1/30,720,000$s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the gold sequence generated by being initialized by the cell ID. Thereafter, the gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

Meanwhile, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| Numerology (μ) | 0 | 1 | 2 | 3 | 4 | 5 |
| --- | --- | --- | --- | --- | --- | --- |
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be configured to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support FR2 as well as FR1. The FR2 may be classified into FR2-1 and FR2-2. FR1 may be a frequency band of 6 GHz or below, FR2-1 may be a frequency band of 24.25 to 52.6 GHz, and FR2-2 may be a frequency band of 52.6 to 71 GHz. In exemplary embodiments, FR2 may be a frequency band including FR2-1, FR2-2, or both of FR2-1 and FR2-2. Subcarrier spacings that can be used for data transmission in each of FR1, FR2-1, and FR2-2 may be defined as shown in Table 2 below. Subcarrier spacings that can be used for SSB transmission in each of FR1, FR2-1, and FR2-2 may be defined as shown in Table 3 below. Subcarrier spacings that can be used for random access channel (RACH) transmission (e.g., Msg1 or Msg-A) in each of FR1, FR2-1, and FR2-2 may be defined as shown in Table 4 below.

TABLE 2

| Data | | |
| --- | --- | --- |
| FR1 | FR2-1 | FR2-2 |
| 15 kHz, 30 kHz, 60 kHz (optional) | 60 kHz, 120 kHz | 120 kHz, 480 kHz, 960 kHz |

TABLE 3

| SSB | | |
| --- | --- | --- |
| FR1 | FR2-1 | FR2-2 |
| 15 kHz, 30 kHz | 120 kHz, 240 kHz | 120 kHz, 480 kHz, 960 kHz |

TABLE 4

| RACH | | |
| --- | --- | --- |
| FR1 | FR2-1 | FR2-2 |
| 1.25 kHz, 5 kHz, 15 kHz, 30 kHz | 60 kHz, 120 kHz | 120 kHz, 480 kHz, 960 kHz |

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

In addition, in the NR system, SSBs may also be transmitted in a beam sweeping scheme. The SSB may refer to a synchronization signal/physical broadcast channel (SS/PBCH) block. The SSB may be composed of a PSS, an SSS, a PBCH, and the like. In the SSB, the PSS, the SSS, and the PBCH may be configured in a time division multiplexing (TDM) manner. One SSB may be transmitted using N consecutive OFDM symbols. Here, N may be an integer equal to or greater than 4. The base station may periodically transmit the SSB, and the terminal may acquire frequency/time synchronization, a cell ID, system information, and the like based on the SSB received from the base station. The SSB may be transmitted as follows.

Figure 5:
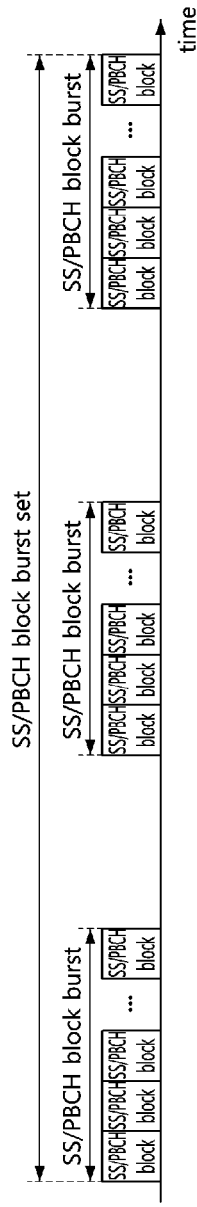
FIG. 5 is a conceptual diagram illustrating a first exemplary embodiment of a transmission method of SSBs in a communication system.

FIG. 5 is a conceptual diagram illustrating a first exemplary embodiment of a transmission method of SSBs in a communication system.

Referring to FIG. 5, one or more SSBs may be transmitted in a beam sweeping scheme within an SSB burst set. Up to L SSBs may be transmitted within one SSB burst set. L may be an integer equal to or greater than 2, and may be defined in the 3GPP standard. Depending on a region of a system frequency, L may vary. Within the SSB burst set, the SSBs may be located consecutively or distributedly. The consecutive SSBs may be referred to as an 'SS/PBCH block burst' or 'SSB burst'. The SSB burst set may be repeated periodically, and system information (e.g., MIB) transmitted through the PBCHs of the SSBs within the SSB burst set may be the same. An index of the SSB, an index of the SSB burst, an index of an OFDM symbol, an index of a slot, and the like may be indicated explicitly or implicitly by the PBCH.

Figure 6:
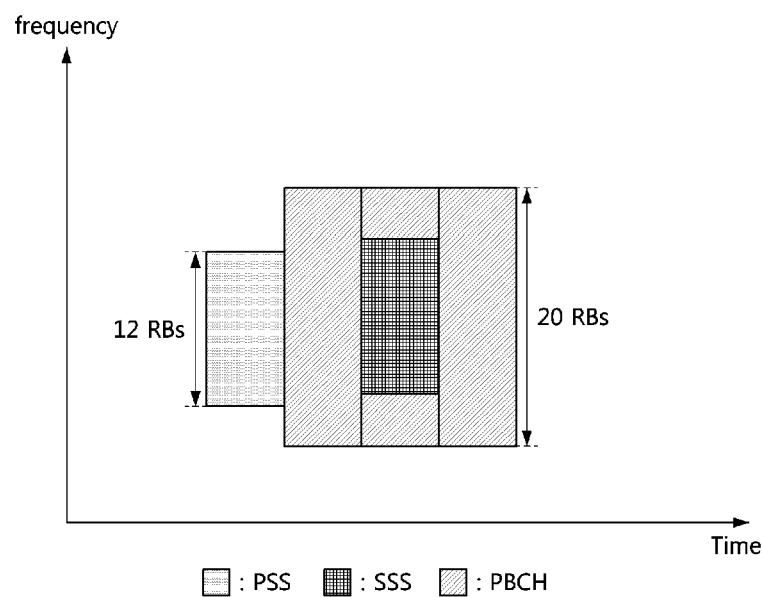
FIG. 6 is a conceptual diagram illustrating a first exemplary embodiment of an SSB in a communication system.

FIG. 6 is a conceptual diagram illustrating a first exemplary embodiment of an SSB in a communication system.

Referring to FIG. 6, signals and a channel are arranged within an SSB in the order of 'PSS→PBCH→SSS→PBCH'. The PSS, SSS, and PBCH within the SSB may be configured in a TDM scheme. In a symbol where the SSS is located, the PBCH may be located in frequency resources above the SSS and frequency resources below the SSS. When the maximum number of SSBs is 8 in the frequency band of 6 GHz or below, an SSB index may be identified based on a demodulation reference signal used for demodulating the PBCH (hereinafter, referred to as 'PBCH DMRS'). When the maximum number of SSBs is 64 in the frequency band of 6 GHz or above, LSB 3 bits of 6 bits representing the SSB index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SSBs may be multiplexed in the frequency domain within the system bandwidth of the NR system supporting a wide band. In this case, the SSBs may be transmitted as follows.

Figure 7:
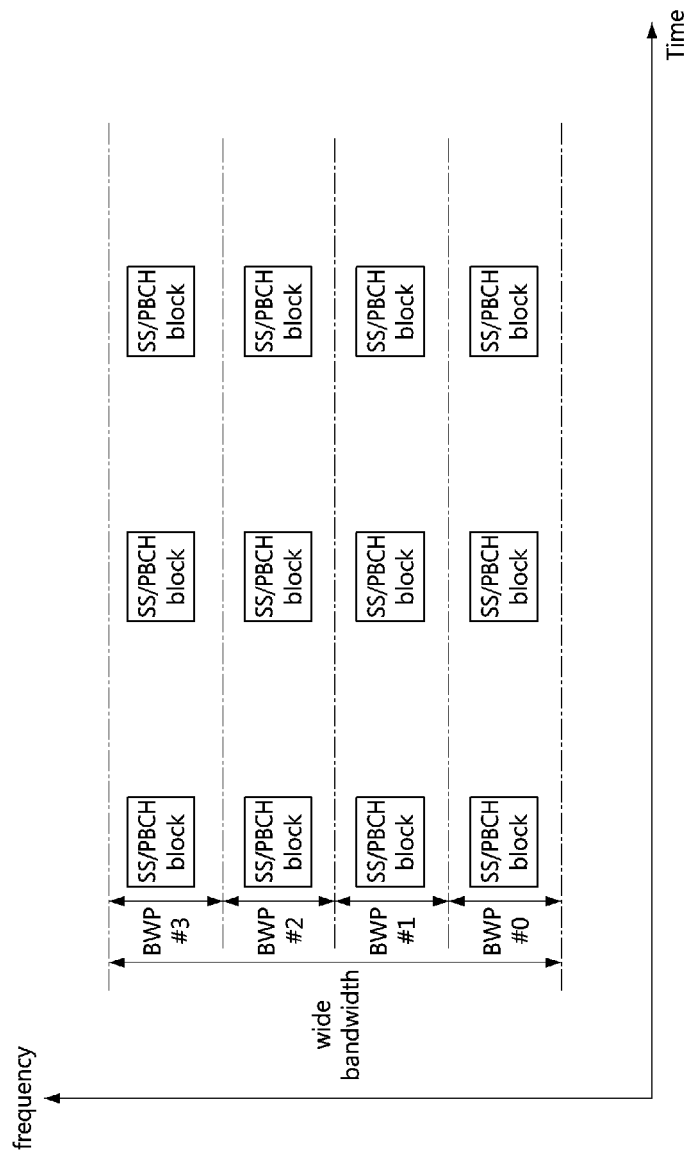
FIG. 7 is a conceptual diagram illustrating a second exemplary embodiment of a method of transmitting SSBs in a communication system.

FIG. 7 is a conceptual diagram illustrating a second exemplary embodiment of a method of transmitting SSBs in a communication system.

Referring to FIG. 7, a wide band component carrier (CC) may include a plurality of bandwidth parts (BWPs). For example, the wide band CC may include 4 BWPs. The base station may transmit SSBs in the respective BWPs #0 to #3 belonging to the wide band CC. The terminal may receive the SSB(s) from one or more BWPs of the BWPs #0 to #3, and may perform an initial access procedure using the received SSB.

After detecting the SSB, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SSB. A plurality of SSBs may be transmitted in the entire system band, and one or more SSBs among the plurality of SSBs may be SSB(s) associated with the RMSI. The remaining SSBs may not be associated with the RMSI. The SSB associated with the RMSI may be defined as a 'cell-defining SSB'. The terminal may perform a cell search procedure and an initial access procedure by using the cell-defining SSB. The SSB not associated with the RMSI (e.g., 'other SSB') may be used for a synchronization procedure and/or a measurement procedure in the corresponding BWP. The BWP(s) through which the SSB is transmitted may be limited to one or more BWPs within a wide bandwidth.

The RMSI may be obtained by performing an operation to obtain configuration information of a CORESET from the SSB (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
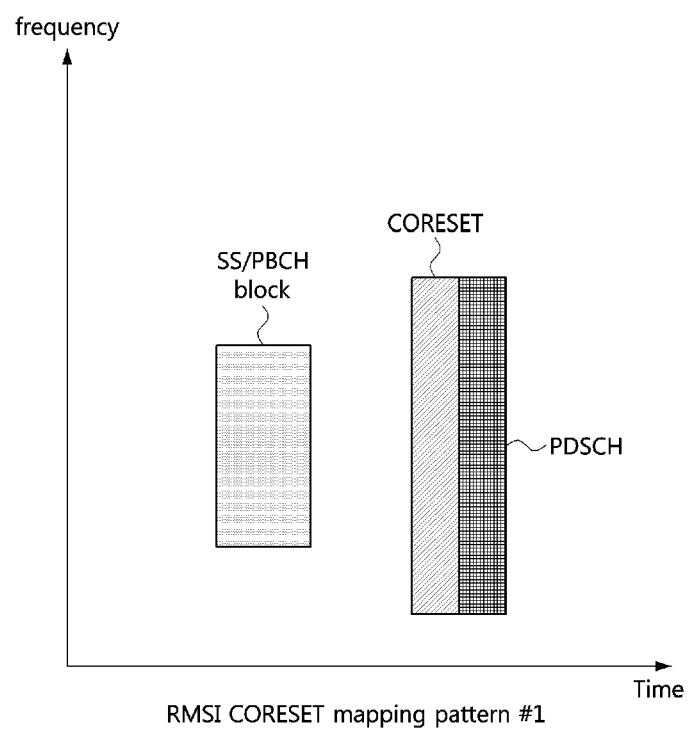
FIG. 8A is a conceptual diagram illustrating an RMSI CORESET mapping pattern #1 in a communication system.
Figure 8B:
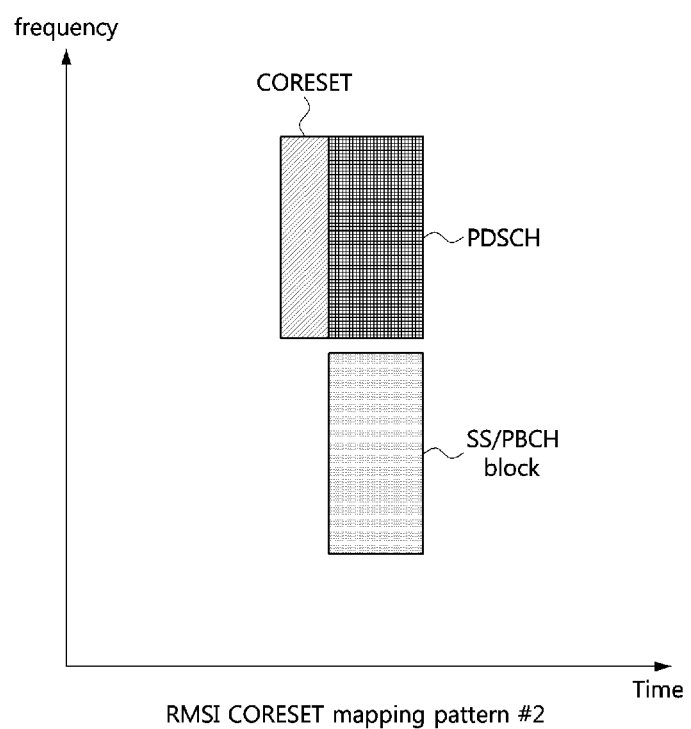
FIG. 8B is a conceptual diagram illustrating an RMSI CORESET mapping pattern #2 in a communication system.
Figure 8C:
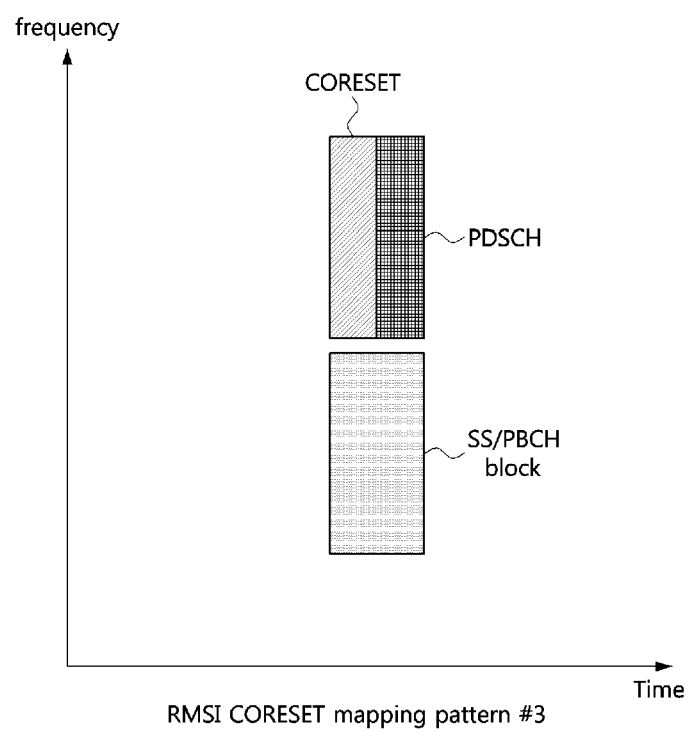
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

Referring to FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SSB, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SSB may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SSB in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SSB may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SSB and the RMSI CORESET/PDSCH. In the RMSI CORESET mapping pattern #3, a combination of numerologies (120 kHz, 120 kHz) may be used for the SSB and the RMSI CORESET/PDSCH.

One RMSI CORESET mapping pattern may be selected from the RMSI CORESET mapping patterns #1 to #3 according to the combination of the numerology of the SSB and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SSB and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 5 below.

TABLE 5

| PDSCH mapping | Normal CP | | | Extended CP | | |
|---|---|---|---|---|---|---|
| type | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

The type A (i.e., PDSCH mapping type A) may be slot-based transmission. When the type A is used, a position of a start symbol of a PDSCH may be configured to one of {0, 1, 2, 3}. When the type A and a normal CP are used, the number of symbols constituting the PDSCH (e.g., the duration of the PDSCH) may be configured to one of 3 to 14 within a range not exceeding a slot boundary. The type B (i.e., PDSCH mapping type B) may be non-slot-based transmission. When the type B is used, a position of a start symbol of a PDSCH may be configured to one of 0 to 12. When the type B and the normal CP are used, the number of symbols constituting the PDSCH (e.g., the duration of the PDSCH) may be configured to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, a PC5-RRC connection may be established between a first terminal (e.g. transmitting terminal that transmits data) and a second terminal (e.g., receiving terminal that receives data), and the PC5-RRC connection may refer to a logical connection for a pair between a source ID of the first terminal and a destination ID of the second terminal. The first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'HARQ-ACK', 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In the groupcast sidelink communication, two HARQ-ACK feedback schemes (i.e., transmission procedures of feedback information) may be supported. When the number of receiving terminals in a sidelink group is large and a service scenario 1 is supported, some receiving terminals belonging to a specific range within the sidelink group may transmit NACK through a PSFCH when data reception fails. This scheme may be a groupcast HARQ-ACK feedback option 1. In the service scenario 1, instead of all the receiving terminals in the sidelink group, it may be allowed for some receiving terminals belonging to a specific range to perform reception in a best-effort manner. The service scenario 1 may be an extended sensor scenario in which some receiving terminals belonging to a specific range need to receive the same sensor information from a transmitting terminal. In exemplary embodiments, the transmitting terminal may refer to a terminal transmitting data, and the receiving terminal may refer to a terminal receiving data.

When the number of receiving terminals in the sidelink group is limited and a service scenario 2 is supported, each of all the receiving terminals belonging to the sidelink group may report HARQ-ACK for data individually through a separate PSFCH. This scheme may be a groupcast HARQ-ACK feedback option 2. In the service scenario 2, since PSFCH resources are sufficient, the transmitting terminal may perform monitoring on HARQ-ACK feedbacks of all the receiving terminals belonging to the sidelink group, and data reception may be guaranteed at all the receiving terminals belonging to the sidelink group.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 μs. When a subcarrier spacing of 15 kHz is used in the NR system, a time period (e.g., length) of one symbol (e.g., OFDM symbol) may be 66.7 μs. When a subcarrier spacing of 30 kHz is used in the NR system, a time period of one symbol (e.g., OFDM symbol) may be 33.3 μs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
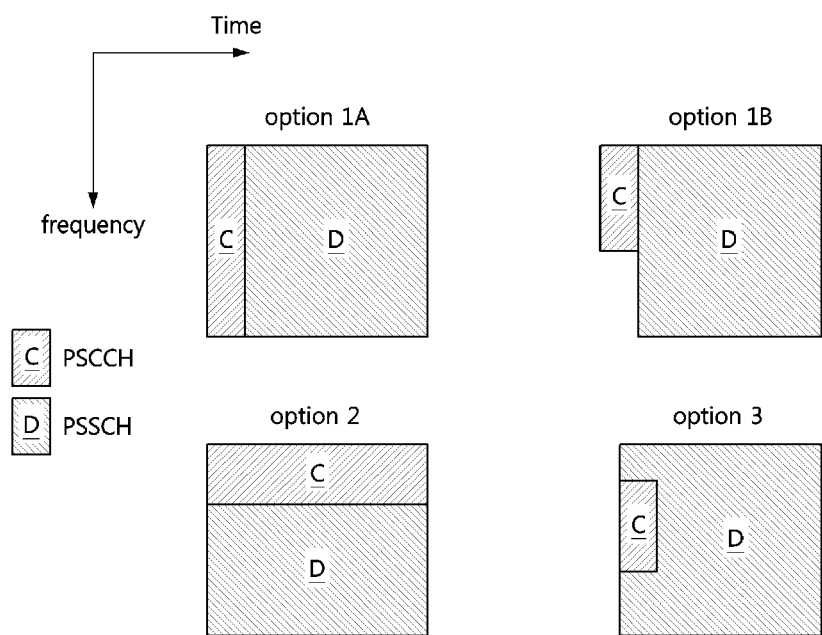
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication.

Referring to FIG. 9, sidelink communication may support an option 1A, an option 1i, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

When the mode 1 is used, the base station may schedule a resource used for sidelink data transmission to the transmitting terminal, and the transmitting terminal may transmit sidelink data to the receiving terminal by using the resource scheduled by the base station. Therefore, a resource conflict between terminals may be prevented. When the mode 2 is used, the transmitting terminal may select an arbitrary resource by performing a resource sensing operation and/or resource selection operation, and may transmit sidelink data by using the selected arbitrary resource. Since the above-described procedure is performed based on an individual resource sensing operation and/or resource selection operation of each transmitting terminal, a conflict between selected resources may occur.

The sidelink communication system supporting Release-16 may be designed for terminals (e.g., vehicle-mounted terminals, vehicle UEs (V-UEs)) that do not have restrictions on battery capacity. Therefore, a power saving issue may not be greatly considered in resource sensing/selection operations for such the terminals. However, in order to perform sidelink communication with terminals having restrictions on battery capacity in the sidelink communication system supporting Release-17 (e.g., a terminal carried by a pedestrian, a terminal mounted on a bicycle, a terminal mounted on a motorcycle, a pedestrian UE (P-UE)), power saving methods will be required. In the present disclosure, a 'V-UE' may refer to a terminal that has no significant restrictions on battery capacity, a 'P-UE' may refer to a terminal with restrictions on battery capacity, and a 'resource sensing/selection operation' may refer to a resource sensing operation and/or a resource selection operation. The resource sensing operation may refer to a partial sensing operation or a full sensing operation. The resource selection operation may refer to a random selection operation. In addition, in the present disclosure, an 'operation of a terminal' may be interpreted as an 'operation of a V-UE' and/or 'operation of a P-UE'.

For power saving in the LTE V2X, a partial sensing operation and/or a random selection operation has been introduced. When the partial sensing operation is supported, the terminal may perform resource sensing operations in partial periods instead of an entire period within a sensing window, and may select a resource based on a result of the partial sensing operation. According to such the operation, power consumption of the terminal may be reduced. When the random selection operation is supported, the terminal may randomly select a resource without performing the resource sensing operation. Alternatively, the random selection operation may be performed together with the resource sensing operation. For example, the terminal may determine resources by performing the resource sensing operation, and may select a resource(s) by performing the random selection operation within the determined resources.

In the LTE V2X supporting Release-14, a resource pool in which the partial sensing operation and/or random selection operation can be performed may be configured independently of a resource pool in which the full sensing operation can be performed. A resource pool capable of performing the random selection operation, a resource pool capable of performing the partial sensing operation, and a resource pool capable of performing the full sensing operation may be independently configured. The terminal may select resources by performing the random selection operation, the partial sensing operation, and/or the full sensing operation in the resource pool(s). The terminal may select one operation among the random selection operation and the partial sensing operation, may select a resource(s) by performing the selected sensing operation, and may perform sidelink communication by using the selected resource(s).

In the LTE V2X supporting Release-14, sidelink (SL) data may be periodically transmitted based on a broadcast scheme. In the NR communication system, SL data may be transmitted based on a broadcast scheme, multicast scheme, groupcast scheme, or unicast scheme. In addition, in the NR communication system, SL data may be transmitted periodically or aperiodically. A transmitting terminal may transmit SL data to a receiving terminal, and the receiving terminal may transmit a HARQ feedback (e.g., acknowledgement (ACK) or negative ACK (NACK)) for the SL data to the transmitting terminal on a PSFCH. In the present disclosure, a transmitting terminal may refer to a terminal transmitting SL data, and a receiving terminal may refer to a terminal receiving the SL data.

A terminal having reduced capability (hereinafter, referred to as a 'RedCap terminal') may operate in a specific usage environment. The capability of the RedCap terminal may be lower than the capability of a new radio (NR) normal (i.e., legacy) terminal, and may be higher than that of an LTE-machine type communication (LTE-MTC) terminal, a narrow band internet of things (NB-IoT) terminal, or a low power wide area (LPWA) terminal. For example, a terminal (e.g., surveillance camera) that requires 'high data rate and non-high latency condition' and/or a terminal (e.g., wearable device) that requires 'non-high data rate, high latency condition, and high reliability' may exist. In order to support the above-described terminals, the maximum carrier bandwidth in FR1 may be reduced from 100 MHz to 20 MHz, and the maximum carrier bandwidth in FR2 may be reduced from 400 MHz to 100 MHz. The number of reception antennas of the RedCap terminal may be smaller than the number of reception antennas of the NR normal terminal. When the carrier bandwidth and the number of reception antennas are reduced, a reception performance of the RedCap terminal may decrease, and accordingly, the coverage of the RedCap terminal may decrease.

Hereinafter, communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

In the communication system (e.g., NR system, 6G system), a frequency band of 52.6 GHz may be extended. FR2 may be classified into FR2-1 and FR2-2. A frequency band of 24.25 to 52.6 GHz may be defined as FR2-1, and a frequency band of 52.6 to 71 GHz may be defined as FR2-2. As a frequency band in which the communication system operates increases, frequency offset errors and phase noises may increase. The use of a large SCS may be necessary for robust operations in these environments. In the FR2-1 band, a 60 kHz SCS and/or 120 kHz SCS may be supported, and a 480 kHz SCS and/or 960 kHz SCS may be additionally supported. In addition, design of physical layer signals and channels and physical layer procedures according to the new SCSs may be required. Regarding an initial access procedure, a 120 kHz SSB and/or 240 kHz SSB may be supported in the FR2-1 band, and a 120 kHz SSB and/or 480 kHz SSB may be supported in the FR2-2 band. Here, the 480 kHz SSB may mean an SSB transmitted in radio resources to which the 480 kHz SCS is applied. In order to support the new SCSs, an initial BWP configuration method, initial access related signal and channel design method, and initial access procedure may be required.

As support for various services requiring a high data transmission speed is required, the need for a wide band system (e.g., communication system supporting a wide band) is increasing. The need for a communication system supporting a higher frequency band than FR2-2 is increasing. Since available frequency resources are relatively abundant in a high frequency band, a wide system bandwidth can be supported. When it is possible to simultaneously transmit a plurality of beams using a plurality of panels in a communication system supporting a wide band, an initial access time and/or measurement time of the terminal may be reduced by transmitting a plurality of SSBs in the frequency domain. Accordingly, it is necessary to newly define the initial access procedure and/or measurement procedure in consideration of this.

As in the above-described exemplary embodiment of FIG. 7, when the base station transmits a plurality of SSBs in the frequency domain in a wide band system (i.e., when a plurality of SSBs are multiplexed in the frequency domain), the terminal may perform the initial access procedure by using an SSB (e.g., cell-defining SSB) associated with an RMSI among the plurality of SSBs. When other SSB(s), which is not a cell-defining SSB, is detected, the terminal may identify that the detected SSB is not a cell-defining SSB and additional information on a frequency position at which cell-defining SSBs are transmitted based on information of a PBCH payload of the detected SSB. Therefore, the terminal can find the cell-defining SSB. Other SSB(s) may be used for a procedure for time and/or frequency synchronization acquisition and/or a measurement procedure in a corresponding frequency band (e.g., a frequency band at which other SSB(s) are detected). Other SSB(s) may be a non-cell-defining SSB.

Figure 10:
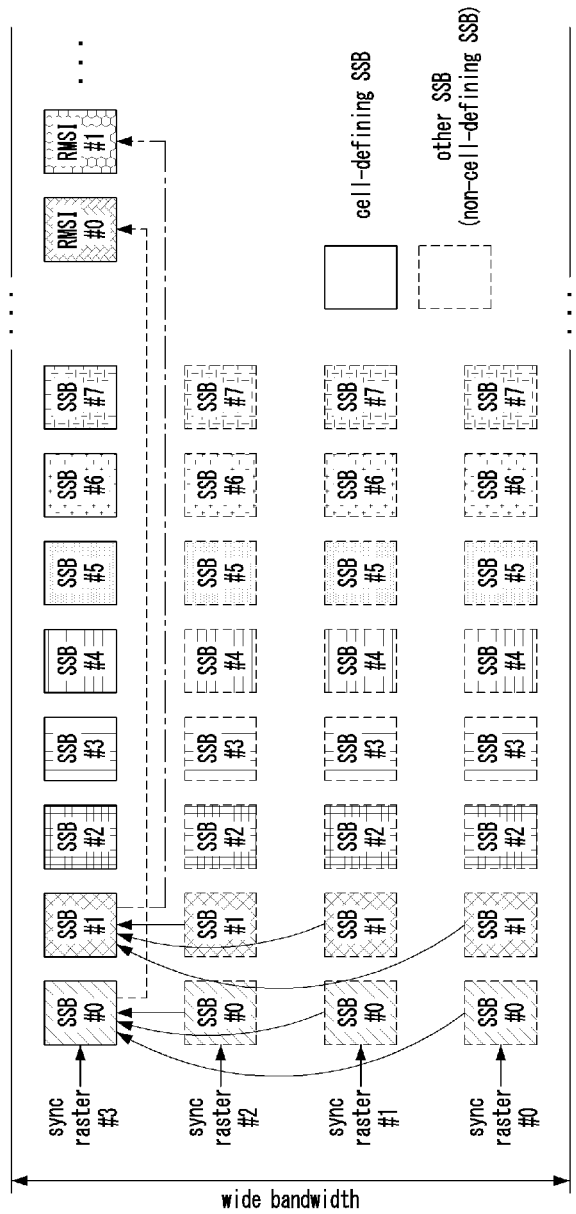
FIG. 10 is a conceptual diagram illustrating a first exemplary embodiment of a method for transmitting and receiving a plurality of SSBs in the frequency domain.

FIG. 10 is a conceptual diagram illustrating a first exemplary embodiment of a method for transmitting and receiving a plurality of SSBs in the frequency domain.

Referring to FIG. 10, SSBs having the same beam pattern may be multiplexed in the frequency domain. The beam pattern may mean a pattern of beams used for signal and/or channel transmission. In sync rasters #0 to #3, the beam patterns may be the same as 'beam #0→beam #1→beam #2→beam #3→beam #4→beam #5→beam #6→beam #7'. SSBs having the same SSB index may be transmitted in the same time period. For example, SSBs having an SSB index #0 may be transmitted in a first time period, and SSBs having an SSB index #1 may be transmitted in a second time period after the first time period.

The base station may transmit a plurality of SSBs in the frequency domain of the wide band system. Different hatchings applied to the SSBs may indicate different beams. SSBs to which the same hatching is applied may mean SSBs transmitted through the same beam. Each of the sync rasters #0 to #3 may be a frequency position at which SSBs can be transmitted. SSB(s) may be transmitted in each of the sync rasters #0 to #3. The SSBs transmitted in the sync rasters #0 to #2 may be other SSBs (e.g., non-cell-defining SSBs). The SSBs transmitted in the sync raster #3 may be cell-defining SSBs used in the initial access procedure. The cell-defining SSB may be associated with an RMSI. The terminal may receive the cell-defining SSB, may obtain system information through the RMSI associated with the cell-defining SSB, and may perform a procedure for initial access based on the system information.

The terminal may detect other SSBs in the sync rasters #0 to #2. The terminal may know that the detected SSB is not the cell-defining SSB based on information of a PBCH payload of the detected SSB, and may obtain additional information for finding the position of the sync raster #3 in which the cell-defining SSBs are transmitted based on the PBCH payload of the detected SSB. The additional information for finding the position of the sync raster #3 may be accurate frequency position information, adjacent frequency position information (e.g., an offset corresponding to a global synchronization channel number (GSCN)), or specific frequency range information according to the frequency position at which other SSB is detected and the frequency position at which the cell-defining SSB is transmitted.

The cell-defining SSB may be transmitted at a position of a preset sync raster. Other SSB(s) may be transmitted at an arbitrary frequency position other than the sync raster. A plurality of SSBs transmitted in the frequency domain during the same time period may be transmitted through the same beam, and SSBs transmitted in different time periods may be SSBs transmitted through different beams. For example, a transmission beam of SSBs in a first time period may be different from a transmission beam of SSBs in a second time period. When the base station is capable of simultaneously transmitting a plurality of beams (e.g., different beams) using a plurality of panels, a plurality of SSBs simultaneously transmitted in the frequency domain may be transmitted through different beams. A terminal supporting a reception operation in a wide band may simultaneously perform a reception operation on a plurality of SSBs transmitted through a plurality of beams in the frequency domain.

Figure 11:
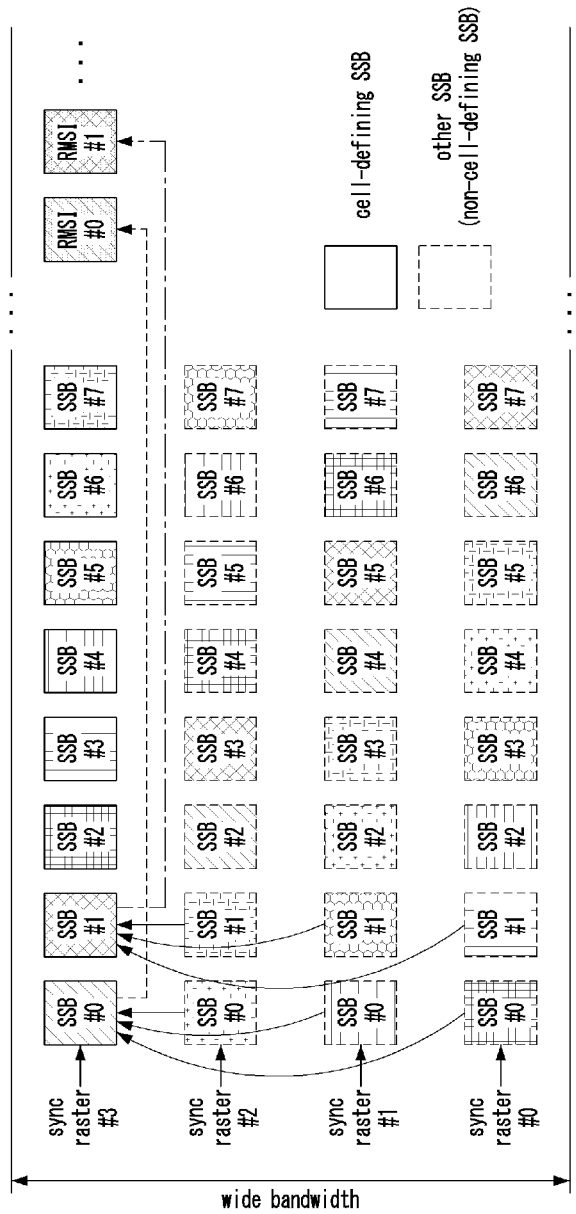
FIG. 11 is a conceptual diagram illustrating a second exemplary embodiment of a method for transmitting and receiving a plurality of SSBs in the frequency domain.

FIG. 11 is a conceptual diagram illustrating a second exemplary embodiment of a method for transmitting and receiving a plurality of SSBs in the frequency domain.

Referring to FIG. 11, SSBs having different beam patterns may be multiplexed in the frequency domain. In the sync rasters #0 to #3, beam patterns may be different from each other. For example, in the sync raster #3, the beam pattern may be 'Beam #0→Beam #1→Beam #2→Beam #3→Beam #4→Beam #5→Beam #6→Beam #7'. In the sync raster #2, the beam pattern may be 'beam #6→beam #7→beam #0→beam #1→beam #2→beam #3→beam #4→beam #5'. That is, in the sync rasters #3 and #2, the beam #0 and beam #6 may be used during a first time period, the beam #1 and beam #7 may be used during a second time period, and the beam #2 and beam #0 may be used during a third time period.

The base station may perform an operation of simultaneously transmitting using a plurality of beams. The base station may transmit a plurality of SSBs through different beams in the frequency domain. Different hatchings applied to the SSBs may indicate different beams. SSBs to which the same hatching is applied may mean SSBs transmitted through the same beam. A terminal capable of a reception operation in a wide band may simultaneously receive a plurality of SSBs transmitted through different beams in the frequency domain. The terminal may perform an initial access procedure using a cell-defining SSB. When a plurality of cell-defining SSBs are not transmitted in the frequency domain, it may be difficult to utilize a plurality of cell-defining SSBs in the initial access procedure.

In a measurement procedure, the terminal may measure signals (e.g., SSBs) simultaneously received through a plurality of beams. Accordingly, an execution time of the measurement procedure in the terminal may be shortened. However, when the same SSB index is mapped to different beams, ambiguity in the relationship between beams and SSBs may occur. Since the SSB index may indicate a temporal position where the SSB is transmitted, the terminal may acquire time synchronization based on the SSB index. Since an SSB (e.g., SSB index) is mapped to a specific beam (e.g., beam index), the SSB index may implicitly mean an index of the specific beam. However, in the exemplary embodiment of FIG. 11, a plurality of SSBs simultaneously transmitted through different beams in the frequency domain may all have the same SSB index. In this case, there may be no problem for the terminal to acquire time synchronization using the plurality of SSBs. However, since the same SSB index is mapped to different beams, and information on the beam is not defined separately, ambiguity may occur in obtaining beam information.

For example, since a transmission beam of the SSB #0 transmitted in the sync raster #0 during the first time period is the same as a transmission beam of the cell-defining SSB #2 transmitted in the sync raster #3 during the third time period, it may be difficult for the terminal to obtain beam information based on the SSB index. When the relationship between beams and SSB indexes applied to the cell-defining SSBs is applied to SSBs transmitted at other frequency positions (e.g., sync raster #0, #1, and/or #2), the terminal may obtain information on the beam without ambiguity. However, ambiguity in time information (e.g., time synchronization) may occur in the terminal.

Figure 12:
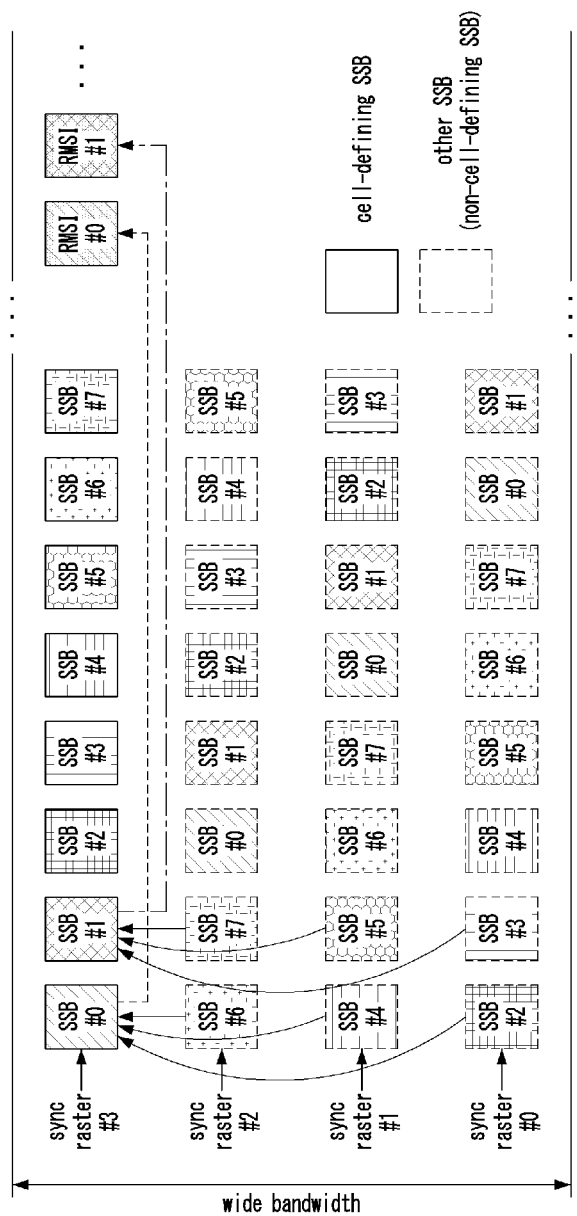
FIG. 12 is a conceptual diagram illustrating a third exemplary embodiment of a method for transmitting and receiving a plurality of SSBs in the frequency domain.

FIG. 12 is a conceptual diagram illustrating a third exemplary embodiment of a method for transmitting and receiving a plurality of SSBs in the frequency domain.

Referring to FIG. 12, SSBs having different beam patterns and different SSB indexes may be multiplexed in the frequency domain. Different hatchings applied to the SSBs may indicate different beams. SSBs to which the same hatching is applied may mean SSBs transmitted through the same beam. A mapping relationship between cell-defining SSB indexes and beams may be applied to other SSBs transmitted at other frequency positions (e.g., sync raster #0, #1, and/or #2). Since the mapping relationship between SSB indexes and beams detected at other frequency position(s) is the same as the mapping relationship between cell-defining SSB indexes and beams, ambiguity may not occur in obtaining beam information in the terminal. However, ambiguity of time information (e.g., time synchronization) may occur in the terminal.

For example, since a transmission beam of the SSB #2 obtained in the sync raster #0 during the first time period is the same as a transmission beam of the cell-defining SSB #2 obtained in the sync raster #3 during the third time period, ambiguity of beam information may not occur in the terminal. Although the SSB #2 in the sync raster #0 and the cell-defining SSB #0 in the sync raster #3 are transmitted in the same time resource (e.g., time period) in the time domain, since the two SSBs (i.e., SSB #2, SSB #0) have different indexes, ambiguity of time information may occur in the terminal. In order to solve the above-mentioned problem, an SSB candidate index indicating the position of the SSB in the time domain may be newly defined instead (or in addition to) the SSB index. The SSB index may be used to convey beam information, and the SSB candidate index may be used to convey time information.

The base station may signal information on a mapping relationship between SSB candidate indexes and SSB indexes for SSBs multiplexed in the frequency domain to the terminal. The information on the mapping relationship between SSB candidate indexes and SSB indexes may be referred to as 'SSB mapping information' or 'mapping relationship information'. The terminal may receive information on the mapping relationship between SSB candidate indexes and SSB indexes (i.e., SSB mapping information or mapping relationship information) from the base station, and may identify an SSB candidate index mapped to an SSB index and/or an SSB index mapped to an SSB candidate index based on the mapping relationship. The terminal may identify beam information based on the SSB index, and may identify time information (e.g., time synchronization) based on the SSB candidate index.

Figure 13:
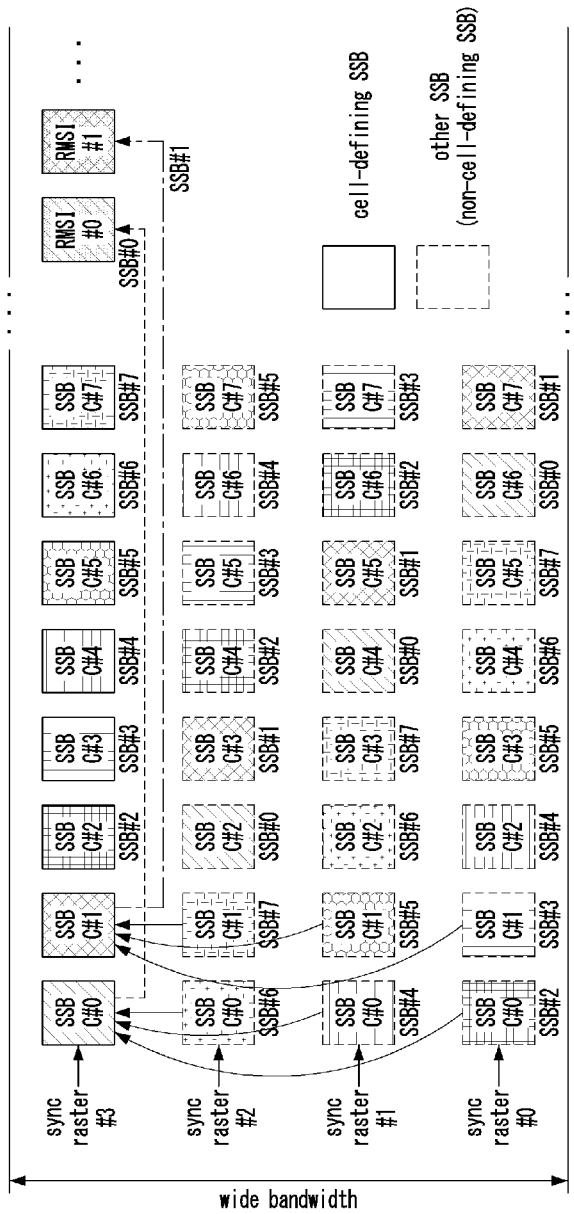
FIG. 13 is a conceptual diagram illustrating a fourth exemplary embodiment of a method for transmitting and receiving a plurality of SSBs in the frequency domain.

FIG. 13 is a conceptual diagram illustrating a fourth exemplary embodiment of a method for transmitting and receiving a plurality of SSBs in the frequency domain.

Referring to FIG. 13, SSBs having different beam patterns and the same SSB candidate index may be multiplexed in the frequency domain. The SSB candidate may be referred to as 'SSB candidate (C)'. Different hatchings applied to the SSBs may indicate different beams. SSBs to which the same hatching is applied may mean SSBs transmitted through the same beam. The base station may define SSB candidate indexes, and may signal, to the terminal, information on a frequency position (e.g., sync raster) at which SSBs are transmitted and/or information on a mapping relationship between SSB candidate indexes and SSB indexes according to the frequency position at which the SSBs are transmitted (i.e., SSB mapping information). The SSB mapping information may be defined for each frequency position. The SSB mapping information may be transmitted through at least one of a PBCH, RMSI, system information, RRC message, or combinations thereof.

The terminal may receive the information on the frequency position at which the SSBs are transmitted and/or the SSB mapping information from the base station. The terminal may receive an SSB from the base station, identify an SSB candidate index for the corresponding SSB based on a PBCH DMRS and PBCH payload included in the SSB, and identify an SSB index mapped to the SSB candidate index based on the SSB mapping information. The terminal may identify beam information (e.g., an index of a beam used for transmission of the corresponding SSB) based on the SSB index, and obtain time information (e.g., time synchronization) based on the SSB candidate index.

The SSB candidate index may be defined based on a transmission position in the time domain (e.g., a time period in which the corresponding SSB is transmitted) regardless of the frequency position in the frequency domain. For example, an SSB transmitted first in the time domain (e.g., the SSB transmitted during the first time period) may have an SSB candidate index #0, and SSB candidate indexes of SSBs transmitted thereafter may be SSB candidate indexes #1, #2, #3, and #4 according to their transmission order. The base station may signal SSB mapping information for each frequency position (e.g., sync raster) at which SSBs are transmitted to the terminal. For example, the base station may signal, to the terminal, SSB mapping information #0 for the sync raster #0, SSB mapping information #1 for the sync raster #1, SSB mapping information #2 for the sync raster #2, and SSB mapping information #3 for the sync raster #3.

SSB candidate indexes of all SSBs transmitted during the first time period in the time domain may be defined as 0. The SSB index mapped to the SSB candidate index=0 in the sync raster #0 may be 2. That is, a mapping relationship of [SSB C #0, SSB #2] may be defined in the sync raster #0. The SSB index mapped to the SSB candidate index=0 in the sync raster #1 may be 4. That is, a mapping relationship of [SSB C #0, SSB #4] may be defined in the sync raster #1. The SSB index mapped to the SSB candidate index=0 in the sync raster #2 may be 6. That is, a mapping relationship of [SSB C #0, SSB #6] may be defined in the sync raster #2. The base station may signal the above-described mapping relationship information (i.e., SSB mapping information) to the terminal.

The terminal may receive (e.g., detect) an SSB from the base station, and may identify an SSB candidate index of the SSB based on a PBCH DMRS and/or PBCH payload of the SSB. A method of identifying the SSB candidate index may be the same as or similar to the method of identifying the SSB index. The terminal may identify an SSB index mapped to the SSB candidate index based on the SSB mapping information (e.g., SSB mapping information for each frequency position). The terminal may obtain time information based on the SSB candidate index, and may obtain beam information (e.g., beam information for each frequency position) based on the SSB index. For example, the terminal may detect the SSB C #0 in the sync raster #0, and may identify the SSB index (e.g., SSB #2) mapped to the SSB C #0 based on the SSB mapping information. The terminal may obtain beam information (e.g., beam index) based on the SSB #2, and may acquire time synchronization based on the SSB C #0.

The base station may signal only information on the mapping relationship between the SSB candidate index (e.g., SSB C #0) and the SSB index of the SSB located in the first time period in the time domain to the terminal. The terminal may obtain the information on the above mapping relationship from the base station, and may identify SSB indexes mapped to SSB candidate indexes by applying the above mapping relationship to SSBs sequentially received in the time domain. According to the above-described method, a signaling overhead for information on the mapping relationship between SSB candidate indexes and SSB indexes (i.e., SSB mapping information) may be reduced.

When information on the mapping relationship of [SSB C #0, SSB #2] in the sync raster #0 is signaled to the terminal, the terminal may identify mapping relationships [SSB C #1, SSB #3], [SSB C #2, SSB #4], and [SSB C #3, SSB #5] by applying the above-described mapping relationship to SSBs received in the sync raster #0. To support the operation described above, it may be preferable for the base station to allocate beams appropriately in the time and/or frequency domain. In order to provide the base station with a degree of freedom in beam deployment, a signaling operation of information of the mapping relationships between all SSB candidate indexes and all SSB indexes for each frequency position may be required. In this case, a signaling overhead for the information of the above-described mapping relationships may significantly increase.

At the frequency position (e.g., sync raster #3) at which cell-defining SSBs are transmitted, the SSB candidate index and the SSB index may be defined to always have the same value, and the base station may signal, to the terminal, information of a mapping relationship between SSB candidate indexes and SSB indexes for a frequency position at which other SSB(s) (e.g., non-cell-defining SSB) is transmitted. That is, the base station may not signal, to the terminal, the information of the mapping relationship between SSB candidate indexes and SSB indexes for the frequency position at which the cell-defining SSBs are transmitted. According to the above-described method, the terminal performing the initial access procedure based on the cell-defining SSB may correctly obtain time information and/or beam information based on the detected SSB index without receiving additional signaling.

As another method of signaling information on a frequency position at which SSBs are transmitted and/or information on a mapping relationship between SSB candidate indexes and SSB indexes according to the frequency position, the base station may signal, to the terminal, at least one of information on the number of beams in the frequency domain (e.g., information on the number of beams multiplexed in the frequency domain), information on the total number of beams (e.g., information on the total number of beams used for transmission of SSBs), an SSB index offset, an offset application scheme (e.g., application in descending order or ascending order according to the frequency position), or combinations thereof. The terminal may receive the above-described information from the base station.

In the exemplary embodiment of FIG. 13, the total number of beams may be 8, the number of beams multiplexed in the frequency domain among the 8 beams may be 4, the SSB index offset may be 6, the SSB index offset may applied in descending order in the frequency domain. The above-described information may be signaled from the base station to the terminal. In this case, the SSB candidate indexes may be the same as the SSB indexes for the frequency position (e.g., sync raster #3) at which the cell-defining SSBs are transmitted. At a frequency position (e.g., sync raster #0, #1, and/or #2) at which other SSB(s) (e.g., non-cell-defining SSB) is transmitted, the SSB index may be determined based on Equation 1 below. In Equation 1, n may be an integer greater than or equal to 0.

$$SSB \text{ index in the sync raster } \#n =$$
$$(SSB \text{ index at the sync raster } \#n + 1 + SSB \text{ index offset})$$
$$\mod (\text{the total number of beams})$$

[Equation 1]

For example, based on Equation 1, the SSB index corresponding to the SSB C #0 in the sync raster #2 may be the SSB #6 resulting from ((SSB #0+6) mod 8). Based on Equation 1, the SSB index corresponding to the SSB C #0 in the sync raster #1 may be the SSB #4 resulting from ((SSB #6+6) mod 8). Based on Equation 1, the SSB index corresponding to the SSB C #0 in the sync raster #0 may be the SSB #2 resulting from ((SSB #4+6) mod 8).

The information on a frequency position at which SSBs are transmitted and/or the SSB mapping information may be transmitted to the terminal through at least one of a PBCH, RMSI, other system information, or combinations thereof. Alternatively, the base station may transmit an RRC message (e.g., UE-specific RRC message) including information on a frequency position at which SSBs are transmitted and/or the SSB mapping information to the terminal. The above-described beam information (or information on the number of beams) may be replaced with quasi-colocation (QCL) information (e.g., information on the number of QCLs, information on QCL values, and/or information on the number of beams) and/or a spatial relationship (or information on the number of spatial relationships).

In the above-described exemplary embodiments, some SSBs may not be actually transmitted. Even in this case, it may be preferable to continuously apply the SSB candidate indexes and the SSB indexes as they are. Although the frequency position at which SSBs are transmitted has been described as the sync raster in the above-described exemplary embodiment, the frequency position at which SSBs are transmitted may not be limited to the sync raster. Since other SSB(s) (e.g., non-cell-defining SSB(s)) may be transmitted at arbitrary frequency positions, information on the frequency position may be an absolute radio frequency channel number (ARFCN) instead of a global synchronization channel number (GSCN) which is information on a sync raster.

In the above-described exemplary embodiments, the procedure for acquiring and/or measuring precise time and frequency synchronization using a plurality of SSBs transmitted through different beams in the frequency domain has been described. According to the above-described exemplary embodiments, a latency may be reduced. When a plurality of cell-defining SSBs are transmitted in the frequency domain (e.g., when a plurality of cell-defining SSBs are multiplexed in the frequency domain), the terminal may perform a cell search procedure and/or initial access procedure based on the plurality of cell-defining SSBs. In this case, the latency in the cell search procedure and/or the initial access procedure may be reduced. When the cell-defining SSB is transmitted, an RMSI associated with the cell-defining SSB may be transmitted. Accordingly, when a plurality of cell-defining SSBs are transmitted in the frequency domain, the base station may transmit a plurality of RMSIs associated with the plurality of cell-defining SSBs in the frequency domain. The plurality of RMSIs may be multiplexed in the frequency domain.

Figure 14:
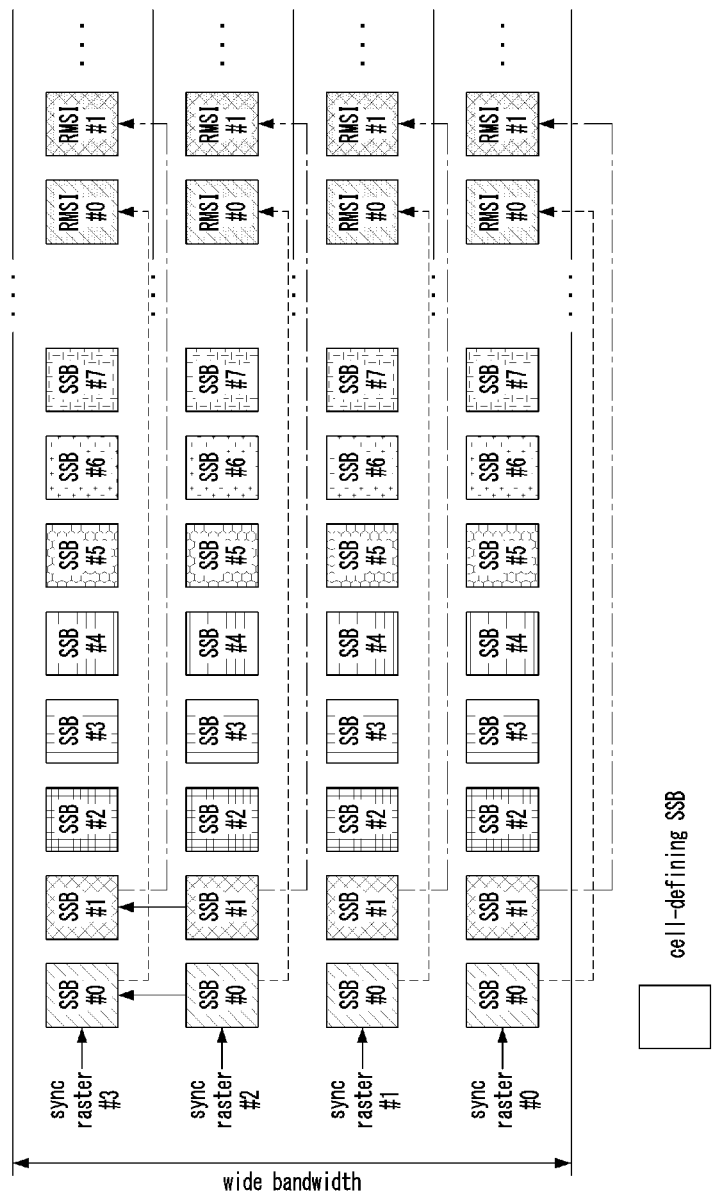
FIG. 14 is a conceptual diagram illustrating a fifth exemplary embodiment of a method for transmitting and receiving a plurality of SSBs in the frequency domain.
Figure 15:
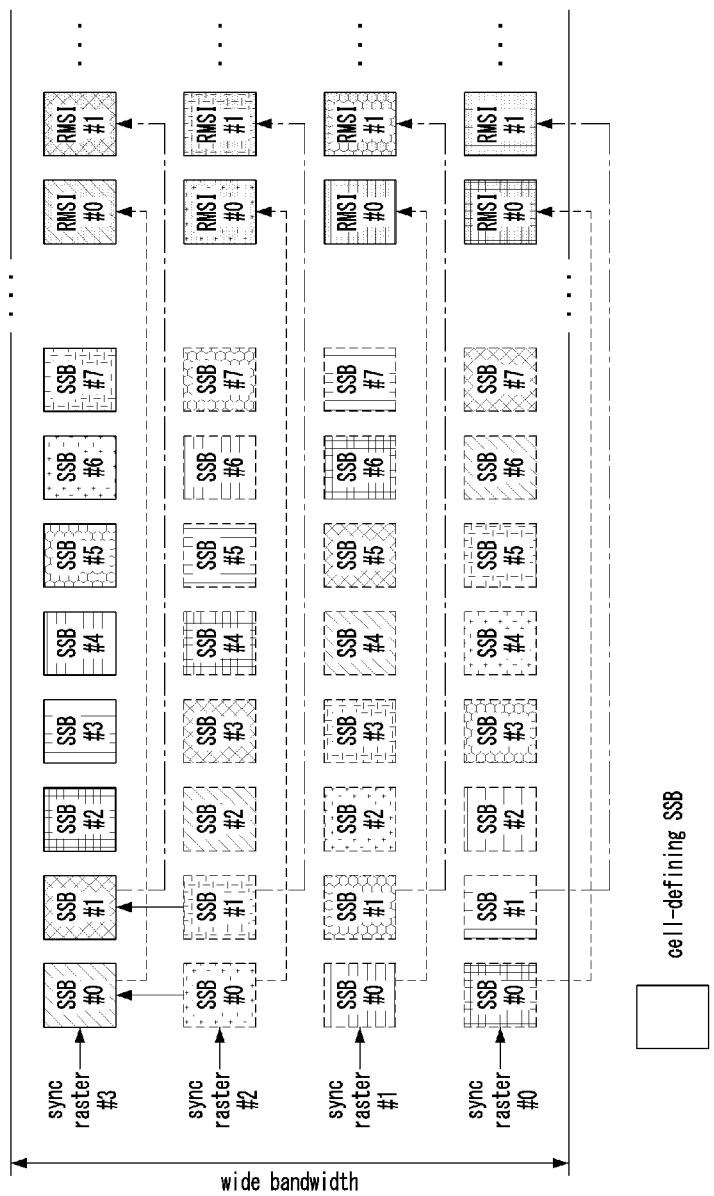
FIG. 15 is a conceptual diagram illustrating a sixth exemplary embodiment of a method for transmitting and receiving a plurality of SSBs in the frequency domain.

FIG. 14 is a conceptual diagram illustrating a fifth exemplary embodiment of a method for transmitting and receiving a plurality of SSBs in the frequency domain, and FIG. 15 is a conceptual diagram illustrating a sixth exemplary embodiment of a method for transmitting and receiving a plurality of SSBs in the frequency domain.

Referring to FIGS. 14 and 15, different hatchings applied to SSBs may indicate different beams. SSBs to which the same hatching is applied may mean SSBs transmitted through the same beam. In the exemplary embodiment of FIG. 14, a plurality of cell-defining SSBs having the same beam pattern may be multiplexed in the frequency domain, and a plurality of RMSIs associated with the plurality of cell-defining SSBs may be transmitted. In the exemplary embodiment of FIG. 15, a plurality of cell-defining SSBs having different beam patterns may be multiplexed in the frequency domain, and a plurality of RMSIs associated with the plurality of cell-defining SSBs may be transmitted.

In the exemplary embodiment of FIG. 14, since the plurality of cell-defining SSBs are simultaneously transmitted through the same beam in the frequency domain, the terminal may perform an initial access procedure by using any cell-defining SSB from among the plurality of cell-defining SSBs. In this case, an effect of reducing a latency in the initial access procedure and/or measurement procedure may not be large. In the exemplary embodiment of FIG. 15, the plurality of cell-defining SSBs may be simultaneously transmitted through different beams in the frequency domain, and a latency may be greatly reduced in a terminal capable of receiving the plurality of cell-defining SSBs through different beams. In this case, as in the exemplary embodiment of FIG. 11, since the same SSB index is mapped to different beams, ambiguity may occur in a relationship between beams and SSB indexes.

In general, since an SSB index indicates a temporal position where a corresponding SSB is transmitted, the terminal may acquire time synchronization based on the SSB index. In general, since an SSB index is mapped to a specific beam, the SSB index may indicate an index for the specific beam. However, in the exemplary embodiment of FIG. 11 or 15, since the plurality of SSBs multiplexed in the frequency domain all have the same SSB index, and are transmitted through different beams, ambiguity of beam information may occur in the terminal. That is, the terminal may obtain time information based on the same SSB index of the plurality of SSBs, but when the same SSB index is mapped to different beams and information on the beam is not separately defined, the ambiguity of the beam information may occur.

For example, in the exemplary embodiment of FIG. 15, since a transmission beam of the SSB #0 in the sync raster #0 during the first time period is the same as a transmission beam of the cell-defining SSB #2 in the sync raster #3 during the third time period, it may be difficult to obtain beam information based on the SSB index. When a relationship between beams and SSB indexes applied to cell-defining SSBs is applied to SSBs (e.g., non-cell-defining SSBs) transmitted at other frequency position(s), the terminal may obtain beam information without ambiguity, but ambiguity of time information may occur in the terminal. When a plurality of cell-defining SSBs and a plurality of RMSIs associated with the plurality of cell-defining SSBs are transmitted together, a transmission overhead may significantly increase. Therefore, resources may not be used efficiently.

When a plurality of cell-defining SSBs are transmitted in the frequency domain for efficient resource utilization, a cell-defining SSB transmitted at a specific frequency position among the plurality of cell-defining SSBs may be defined as a reference cell-defining SSB. The base station may transmit only an RMSI associated with the reference cell-defining SSB. That is, the base station may not transmit RMSIs associated with cell-defining SSBs other than the reference cell-defining SSB. The cell-defining SSB that is not the reference cell-defining SSB may be referred to as a non-reference cell-defining SSB. A mapping relationship between the reference cell-defining SSB and the non-reference cell-defining SSB(s) may be established, and the base station may signal the above-described mapping relationship information to the terminal. The terminal may receive information on the mapping relationship between the reference cell-defining SSB and the non-reference cell-defining SSB(s) from the base station.

The terminal may receive a non-reference cell-defining SSB from the base station, identify a reference cell-defining SSB mapped to the non-reference cell-defining SSB based on the mapping relationship, and receive an RMSI associated with the reference cell-defining SSB from the base station. In order to support the above-described operation, as in the exemplary embodiment of FIG. 13, the base station may define SSB candidate indexes, and may additionally signal, to the terminal, information on a frequency position at which SSBs are transmitted and/or information on a mapping relationship between SSB candidate indexes and SSB indexes according to the frequency position at which the SSBs are transmitted. When a non-reference cell-defining SSB is received, the terminal may identify a position of a reference cell-defining SSB index mapped to the non-reference cell-defining SSB index based on the above-described mapping relationship. For example, the terminal may identify a position of the reference cell-defining SSB having the same index as the non-reference cell-defining SSB index based on the mapping relationship. The terminal may receive the RMSI associated with the identified reference cell-defining SSB, and may perform an additional initial access procedure based on the RMSI.

Figure 16:
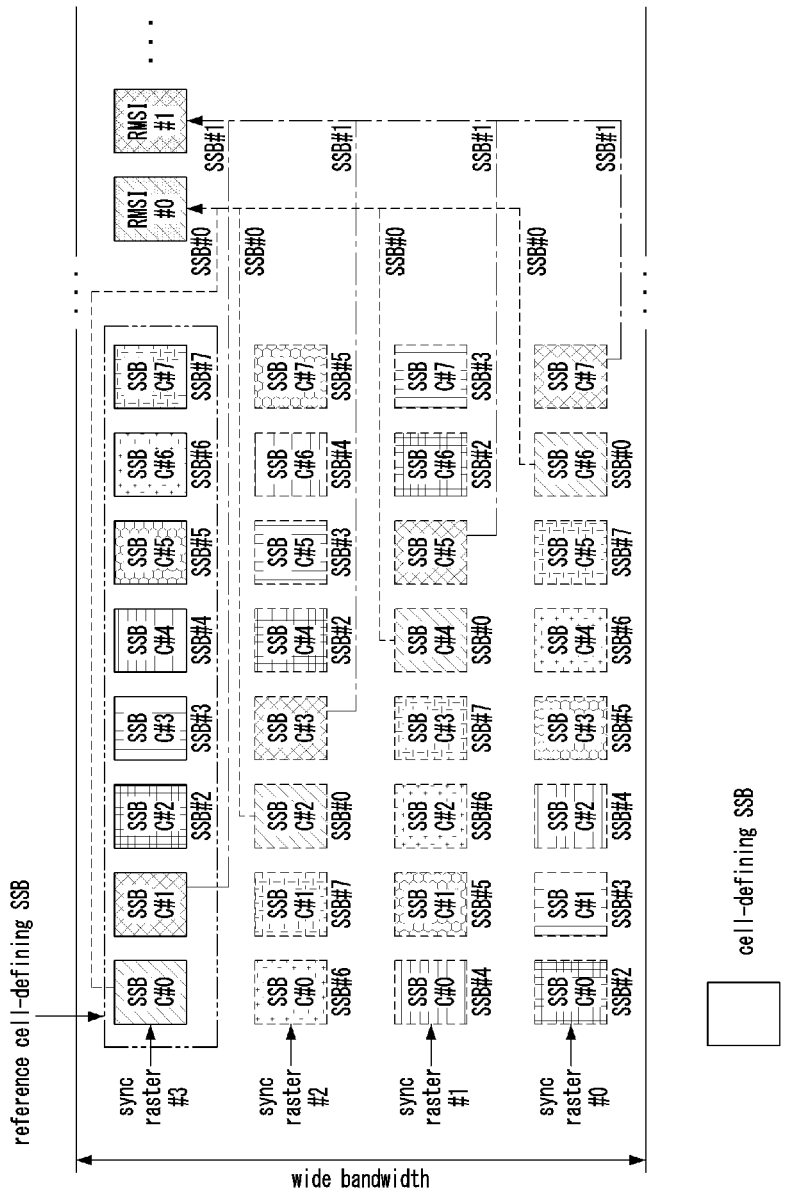
FIG. 16 is a conceptual diagram illustrating a seventh exemplary embodiment of a method for transmitting and receiving a plurality of SSBs in the frequency domain.

FIG. 16 is a conceptual diagram illustrating a seventh exemplary embodiment of a method for transmitting and receiving a plurality of SSBs in the frequency domain.

Referring to FIG. 16, a plurality of cell-defining SSBs (e.g., reference cell-defining SSB(s) and non-reference cell-defining SSB(s)) having different beam patterns and the same SSB candidate index may be multiplexed in the frequency domain. Different hatchings applied to SSBs may indicate different beams. SSBs to which the same hatching is applied may mean SSBs transmitted through the same beam. Identically to or similarly as the exemplary embodiment of FIG. 13, the base station may transmit a plurality of SSBs (e.g., a plurality of cell-defining SSBs) in the frequency domain. The base station may define an SSB candidate index (e.g., SSB candidate #0) from an SSB located first in the time domain regardless of a frequency position, and may signal information on a mapping relationship between SSB candidate indexes and SSB indexes for the frequency position at which the SSB is transmitted to the terminal.

As a method of signaling the information on the mapping relationship between SSB candidate indexes and SSB indexes, the base station may signal information on a mapping relationship between the first SSB candidate index and a corresponding SSB index for each frequency position to the terminal. In this case, the terminal may identify an SSB index by sequentially applying the mapping relationship information received from the base station from the second SSB candidate index at each frequency position.

As another method of signaling information on the mapping relationship between SSB candidate indexes and SSB indexes, the base station may signal, to the terminal, at least one of information on the number of beams in the frequency domain (e.g., information on the number of beams multiplexed in the frequency domain), information on the total number of beams, an SSB index offset, an offset application scheme (e.g., application in descending order or ascending order), or combinations thereof. The terminal may identify an SSB index mapped to an SSB candidate index by performing a modulo operation (e.g., modulo operation the same as or similar to Equation 1) based on the information received from the base station.

Unlike the exemplary embodiment of FIG. 13, since a plurality of cell-defining SSBs are transmitted in the frequency domain, signaling for informing that SSB(s) transmitted at which frequency position is reference cell-defining SSB(s) may be required. In the exemplary embodiment of FIG. 16, the SSBs transmitted in the sync raster #3 may be configured as reference cell-defining SSBs, and the SSBs transmitted in the sync rasters #0, #1, and #2 may be configured as non-reference cell-defining SSBs. The terminal may attempt to receive the plurality of cell-defining SSBs in the frequency domain. When the SSB C #0 is detected in the sync raster #0, the terminal may identify that the SSB C #0 is mapped to the SSB #2 based on the mapping relationship between SSB candidate indexes and SSB indexes, and may receive an RMSI associated with the reference cell-defining SSB #2.

The RMSI may be transmitted based on the frequency position (e.g., sync raster #3) at which the reference cell-defining SSB is transmitted. That is, the RMSI may not be transmitted based on all frequency positions (e.g., sync rasters #0 to #3) at which the cell-defining SSBs (e.g., the reference cell-defining SSBs and the non-reference cell-defining SSBs) are transmitted. The base station may signal information on the frequency position (e.g., sync raster #3) at which the reference cell-defining SSBs are transmitted to the terminal. When it is identified that an index of the SSB received in the sync raster #0 is the SSB #2, the terminal may receive an RMSI #2 associated with the SSB #2 in the sync raster #3.

When the terminal is not able to receive a plurality of SSBs in the frequency domain, since cell-defining SSBs are transmitted in all sync rasters, the terminal may perform an initial access procedure based on a cell-defining SSB received in an arbitrary sync raster. In order to utilize a plurality of SSBs in the initial access procedure, it may be preferable that information on reference cell-defining SSB(s), information on a frequency position at which SSBs are transmitted, and/or SSB mapping information is transmitted through a PBCH payload. The base station may transmit information on the reference cell-defining SSB(s), information on a frequency position at which SSBs are transmitted, and/or SSB mapping information to the terminal through at least one of a PBCH, RMSI, other system information, or combinations thereof. Alternatively, the base station may transmit information on the reference cell-defining SSB(s), information on a frequency position at which SSBs are transmitted, and/or SSB mapping information to the terminal through an RRC message (e.g., UE-specific RRC message). The information on the reference cell-defining SSB(s) may be an indication indicating whether the detected SSB corresponds to a reference cell-defining SSB. Alternatively, the information on the reference cell-defining SSB may be information indicating informing that SSB(s) transmitted at which frequency position is reference cell-defining SSB(s). The information on the reference cell-defining SSB may be information on a frequency position at which the reference cell-defining SSB is transmitted. The information on the reference cell-defining SSB may be information on a mapping relationship between the reference cell-defining SSB and the non-reference cell-defining SSB.

When the base station is able to perform an operation of simultaneously transmitting through a plurality of beams, the base station may transmit a plurality of SSBs through different beams in the frequency domain. When the terminal is able to receive a plurality of SSBs through different beams in a wide band, the terminal may perform an initial access procedure using a plurality of cell-defining SSBs received from the base station. In this case, a latency for the initial access procedure in the terminal may be reduced. Since the cell-defining SSB can be transmitted through an arbitrary sync raster (e.g., arbitrary frequency position), if positions and/or the number of sync rasters capable of transmitting the cell-defining SSBs in a wide band frequency region is not fixed, a terminal complexity and the latency for the initial access procedure may increase.

When a secondary serving cell is added for operations such as carrier aggregation (CA), the terminal may receive, from a primary cell, information related to transmission of a plurality of SSBs in the frequency domain of the newly added secondary serving cell, and may reduce a latency for cell search and time/frequency synchronization for adding the secondary cell (e.g., secondary serving cell) by using the received information.

The above-described exemplary embodiments may be applied to a case in which a plurality of SSBs including one cell-defining SSB and one or more non-cell-defining SSBs are transmitted in the frequency domain and/or a case in which a plurality of cell-defining SSBs are transmitted in the frequency domain. In addition, the above-described exemplary embodiments may be applied to a case in which a plurality of cell-defining SSBs and a plurality of non-cell-defining SSBs are transmitted in the frequency domain as well as the above-described cases. The above-described exemplary embodiments may be applied to the time domain in consideration of a listen-before-talk (LBT) procedure in an NR-unlicensed (U) system in combination with the method of configuring the mapping relationship between SSB candidate indexes and SSB indexes.

When a plurality of SSBs are configured to be transmitted in the time domain, some SSBs among the plurality of SSBs may not be actually transmitted. In order to perform a rate-matching operation in a data reception procedure in a resource region in which some SSBs are not actually transmitted, the base station may transmit, to the terminal, information on whether SSB(s) are actually transmitted through an RMSI and/or UE-specific RRC signaling. When a plurality of SSBs are transmitted not only in the time domain but also in the frequency domain, the base station may signal information on whether the SSB(s) are actually transmitted in the time and frequency domains to the terminal. When the above-described information is transmitted through an RMSI, information on whether the SSB(s) are actually transmitted in the time domain may be applied to the frequency domain as the same pattern, in consideration of an RMSI signaling overhead.

An actual transmission pattern of the SSBs in the time domain may be configured (e.g., signaled) based on the cell-defining SSBs, and the corresponding actual transmission pattern may be applied equally to SSBs (e.g., non-cell-defining SSBs) transmitted at different frequency positions. When a plurality of cell-defining SSBs are transmitted in the frequency domain, an actual transmission pattern of the SSBs may be configured (e.g., signaled) based on the reference cell-defining SSBs among the plurality of cell-defining SSBs, and the actual transmission pattern may be applied to the cell-defining SSBs and/or the non-cell-defining SSBs transmitted at different frequency positions. Even when information on whether the SSB(s) are actually transmitted (e.g., actual transmission pattern) is transmitted through UE-specific RRC signaling, the actual transmission pattern of SSBs may be configured (e.g., signaled) based on the cell-defining SSBs or the reference cell-defining SSBs. The corresponding actual transmission pattern may be applied to SSBs transmitted at other frequency positions. The actual transmission pattern of SSBs may be transmitted at each of the frequency positions in consideration of SSBs transmitted at all frequency position.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, comprising:
receiving, from a base station, a first synchronization signal block (SSB) having an SSB candidate #n at a first frequency position during a first time period;
receiving, from the base station, first mapping relationship information between SSB candidate indexes and SSB indexes;
identifying an SSB #k mapped to the SSB candidate #n based on the first mapping relationship information for the first frequency position;
acquiring time synchronization with respect to the base station based on the SSB candidate #n; and
obtaining beam information for the first frequency position based on the SSB #k,
wherein each of n and k is an integer equal to or greater than 0.

2. The method according to claim 1, further comprising:
receiving, from the base station, a second SSB having an SSB candidate #n+1 at the first frequency position during a second time period;
identifying an SSB #k+1 mapped to the SSB candidate #n+1 based on the first mapping relationship information for the first frequency position;
acquiring time synchronization with respect to the base station based on the SSB candidate #n+1; and
obtaining beam information for the first frequency position based on the SSB #k+1.

3. The method according to claim 1, wherein the first mapping relationship information indicates a mapping relationship between an SSB candidate index and an SSB index of an SSB located first in time domain.

4. The method according to claim 1, further comprising:
receiving, from the base station, a third SSB having the SSB candidate #n at a second frequency position during the first time period;
receiving, from the base station, second mapping relationship information between SSB candidate indexes and SSB indexes;
identifying an SSB #j mapped to the SSB candidate #n based on the second mapping relationship information for the second frequency position;
acquiring time synchronization with respect to the base station based on the SSB candidate #n; and
obtaining beam information for the second frequency position based on the SSB #j,
wherein j is an integer equal to or greater than 0.

5. The method according to claim 4, wherein the first SSB and the third SSB are multiplexed in frequency domain, and a first beam pattern used for transmission of SSBs at the first frequency position is different from a second beam pattern used for transmission of SSBs at the second frequency position.

6. The method according to claim 1, wherein the SSB candidate #n is identified based on a physical broadcast channel (PBCH) demodulation reference signal (DMRS) and/or a PBCH payload included in the first SSB.

7. The method according to claim 1, wherein the first mapping relationship information is obtained through at least one of a PBCH, remaining minimum system information (RMSI), system information, radio resource control (RRC) message, or combinations thereof received from the base station.

8. The method according to claim 1, wherein the beam information means quasi-colocation (QCL) information.

9. A method of a terminal, comprising:
receiving, from a base station, a first synchronization signal block (SSB) having an SSB candidate #n at a first frequency position during a first time period;
identifying that an SSB index mapped to the SSB candidate #n at the first frequency position is an SSB #n;
receiving, from the base station, a second SSB having the SSB candidate #n at a second frequency position during the first time period;
receiving, from the base station, first information indicating an SSB index offset and second information indicating a total number of beams used for transmission of SSBs; and
identifying an SSB #k mapped to the SSB candidate #n of the second SSB at the second frequency position based on the SSB #n, the first information, and the second information,
wherein each of n and k is an integer equal to or greater than 0.

10. The method according to claim 9, wherein the SSB #k is a result of '(the SSB #n+the first information) mod the second information'.

11. The method according to claim 9, wherein the first SSB received at the first frequency position is a cell-defining SSB, and an SSB candidate index and an SSB index of the cell-defining SSB are set to a same value.

12. The method according to claim 9, wherein the first information and the second information are obtained through at least one of a physical broadcast channel (PBCH), remaining minimum system information (RMSI), system information, radio resource control (RRC) message, or combinations thereof received from the base station.

13. The method according to claim 9, further comprising receiving, from the base station, at least one of third information indicating a number of beams multiplexed in frequency domain or fourth information indicating an application scheme of the first information, wherein the fourth information indicates whether the first information is applied in descending order or in ascending order according to frequency positions.

14. The method according to claim 9, wherein the first SSB and the third SSB are multiplexed in frequency domain, a first beam pattern used for transmission of SSBs at the first frequency position is different from a second beam pattern used for transmission of SSBs at the second frequency position, time synchronization with respect to the base station is acquired based on the SSB candidate #n, beam information for the first frequency position is obtained based on the SSB #n, and beam information for the second frequency position is obtained based on the SSB #k.

15. A method of a base station, comprising:
   transmitting, to a terminal, a reference cell-defining synchronization signal block (SSB) at a first frequency position during a first time period;
   transmitting, to the terminal, a non-reference cell-defining SSB at a second frequency position during the first time period;
   transmitting, to the terminal, remaining minimum system information (RMSI) based on the first frequency position; and
   transmitting, to the terminal, information on the reference cell-defining SSB,
   wherein the RMSI is not transmitted based on one or more frequency positions at which the reference cell-defining SSB is not transmitted.

16. The method according to claim 15, wherein the information on the reference cell-defining SSB is at least one of information indicating whether an SSB detected by the terminal corresponds to the reference cell-defining SSB, information indicating that an SSB detected at the first frequency position is the reference cell-defining SSB, information on a mapping relationship between the reference cell-defining SSB and the non-reference cell-defining SSB, or combinations thereof.

17. The method according to claim 15, wherein the information on the reference cell-defining SSB is included in at least one of a physical broadcast channel (PBCH), the RMSI, system information, radio resource control (RRC) message, or combinations thereof transmitted from the base station.

18. The method according to claim 15, wherein the reference cell-defining SSB and the non-reference cell-defining SSB have a same SSB candidate index and different SSB indexes, an SSB candidate index is used by the terminal to acquire time synchronization with respect to the base station, and an SSB index is used by the terminal to obtain beam information for each frequency position.

19. The method according to claim 18, further comprising transmitting, to the terminal, mapping relationship information between the SSB candidate index and the SSB index, wherein the SSB candidate index is identified based on a PBCH demodulation reference signal (DMRS) and/or a PBCH payload included in each of the reference cell-defining SSB and the non-reference cell-defining SSB, and based on the mapping relationship information for each frequency position, the SSB index mapped to the SSB candidate index is identified.

20. The method according to claim 15, wherein the reference cell-defining SSB and the non-reference cell-defining SSB are multiplexed in frequency domain, and a first beam pattern used for transmission of reference cell-defining SSBs at the first frequency position is different from a second beam pattern used for transmission of non-reference cell-defining SSBs at the second frequency position.

* * * * *